US011720620B2

(12) United States Patent
Kowalski et al.

(10) Patent No.: US 11,720,620 B2
(45) Date of Patent: Aug. 8, 2023

(54) AUTOMATED CONTEXTUALIZATION OF OPERATIONAL OBSERVATIONS

(71) Applicant: ZEBRA TECHNOLOGIES CORPORATION, Lincolnshire, IL (US)

(72) Inventors: Matthew Louis Kowalski, Merrick, NY (US); Bobbie Ramsey, Louisville, KY (US); James Roger Morley-Smith, Buckinghamshire (GB); Nicole Daphne Tricoukes, Seaford, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 216 days.

(21) Appl. No.: 16/844,829

(22) Filed: Apr. 9, 2020

(65) Prior Publication Data
US 2021/0319055 A1   Oct. 14, 2021

(51) Int. Cl.
| G06F 16/00 | (2019.01) |
| G06F 16/383 | (2019.01) |
| G06F 16/33 | (2019.01) |
| G06F 9/54 | (2006.01) |
| G10L 15/26 | (2006.01) |
| G06F 16/338 | (2019.01) |

(52) U.S. Cl.
CPC ............ *G06F 16/383* (2019.01); *G06F 9/542* (2013.01); *G06F 16/338* (2019.01); *G06F 16/3334* (2019.01); *G10L 15/26* (2013.01)

(58) Field of Classification Search
CPC .... G06F 16/383; G06F 9/542; G06F 16/3334; G06F 16/338; G06F 16/24522; G10L 15/26
See application file for complete search history.

(56) References Cited

U.S. PATENT DOCUMENTS

| 6,003,027 A | 12/1999 | Prager |
| 6,970,881 B1 | 11/2005 | Mohan et al. |
| 2002/0129011 A1 | 9/2002 | Julien |
| 2004/0250108 A1* | 12/2004 | Parsons ............... H04M 11/002 726/22 |
| 2006/0232472 A1* | 10/2006 | Roslak ............... G01S 5/02522 342/419 |
| 2008/0249793 A1* | 10/2008 | Angell .................. G06Q 30/02 705/1.1 |
| 2013/0185065 A1* | 7/2013 | Tzirkel-Hancock .... G10L 15/20 704/E15.039 |
| 2013/0231920 A1* | 9/2013 | Mathew .................. G06F 16/35 705/7.29 |
| 2015/0032746 A1 | 1/2015 | Lev-Tov et al. |

(Continued)

OTHER PUBLICATIONS

International Search Report and Written Opinion for International Application No. PCT/US2021/26115 dated Jul. 14, 2021.

*Primary Examiner* — Syed H Hasan

(57) ABSTRACT

A method includes: obtaining, at a server, an observation record describing a condition at a facility; determining, from the observation record, a set of selection criteria corresponding to the condition; retrieving, from a repository connected to the server, a set of data objects according to the selection criteria; generating, from the retrieved data objects, a contextual dataset associated with the condition; and presenting the contextual dataset to a client computing device.

16 Claims, 5 Drawing Sheets

(56) References Cited

U.S. PATENT DOCUMENTS

| | | | |
|---|---|---|---|
| 2016/0259308 A1* | 9/2016 | Fadell | H04L 12/2823 |
| 2016/0261932 A1* | 9/2016 | Fadell | H04Q 9/00 |
| 2017/0309290 A1* | 10/2017 | Jones | G10L 21/0208 |
| 2018/0330302 A1* | 11/2018 | Peterson | G06Q 10/06398 |
| 2019/0042988 A1* | 2/2019 | Brown | G06N 5/022 |

* cited by examiner

AUTOMATED CONTEXTUALIZATION OF OPERATIONAL OBSERVATIONS

BACKGROUND

Data collection systems may collect operational parameters from devices such as mobile computers, printers and the like in various environments (e.g. transport and logistics facilities). Such data collection systems may therefore discover operational issues among fleets of devices, but may not be capable of detecting other issues within the facility that are not directly tied to a device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
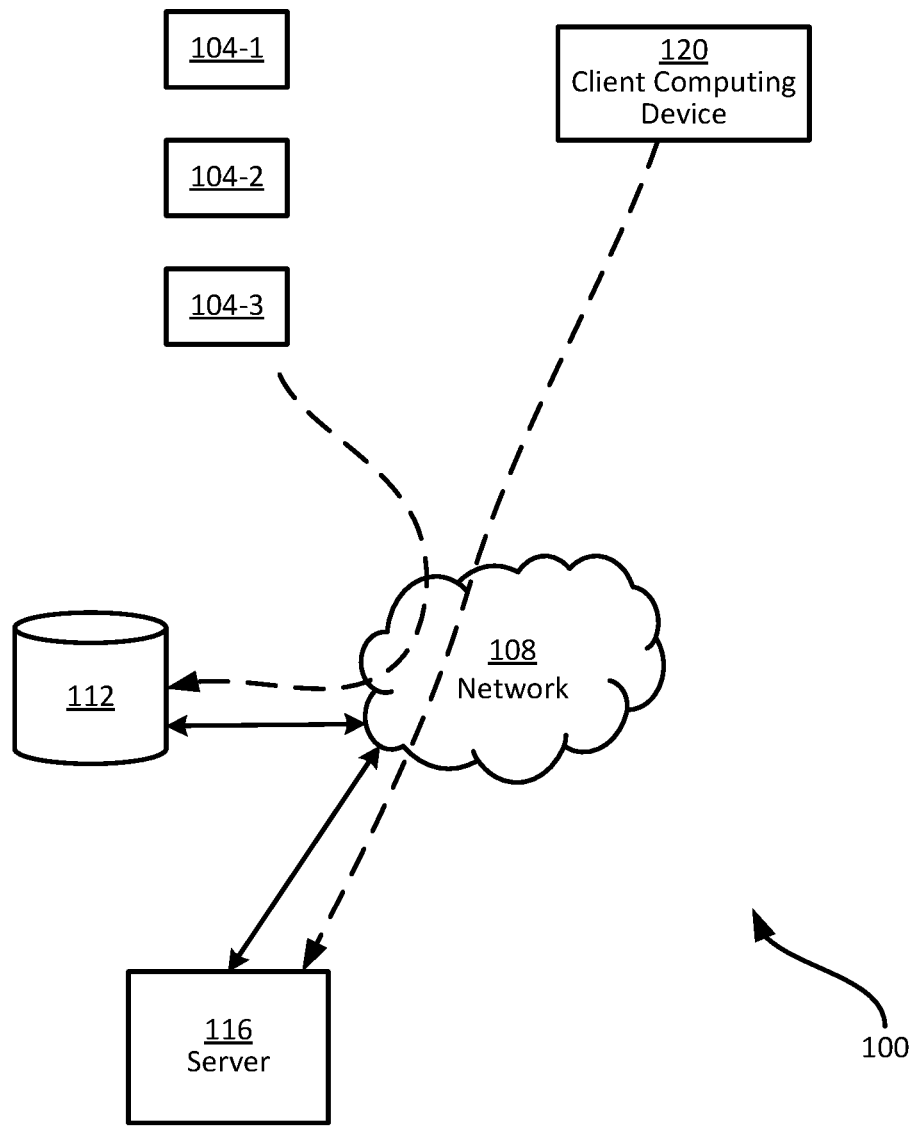
FIG. 1 is a schematic of a system for automated contextualization of operational observations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Facilities such as warehouses or other transport and logistics facilities may deploy a variety of monitoring devices, such as environmental sensors and the like, to monitor conditions within the facility. Measurements or other data from such devices may be transmitted to a central server, cloud infrastructure or the like, where the measurements may be evaluated, e.g. to compare environmental characteristics to expected characteristics. Thus, facilities equipped as above may be enabled to detect out-of-specification conditions and alert operators to the same.

However, the above-mentioned monitoring devices may not enable detection of some conditions, although those conditions may emerge from characteristics monitored by the monitoring devices. For example, temperature and humidity sensors in a facility may not enable the detection of condensation forming on certain packages (e.g. that travel through the facility along a certain path), although the condensation emerges from temperature and humidity in the facility. Further, such condensation may even arise when each monitored portion of the facility shows temperature and humidity characteristics that are within current expected ranges.

Conditions such as condensation on packages, and various others that may not be directly detectable by sensors deployed within a facility, may be readily detected by workers within the facility. However, workers may be unable to determine the origin of such conditions, and it may therefore be computationally expensive or intractable to determine correlations between the sensor data (e.g. temperature and humidity) and observed issues (e.g. condensation on packages). In the absence of such correlations, observations from workers within a facility may be difficult to act on to resolve the observed conditions.

Examples disclosed herein are directed to a method, comprising: obtaining, at a server, an observation record describing a condition at a facility; determining, from the observation record, a set of selection criteria corresponding to the condition; retrieving, from a repository connected to the server, a set of data objects according to the selection criteria; generating, from the retrieved data objects, a contextual dataset associated with the condition; and presenting the contextual dataset to a client computing device.

Additional examples disclosed herein are directed to a server, comprising: a memory; and a processor connected with the memory, the processor configured to: obtain an observation record describing a condition at a facility; determine, from the observation record, a set of selection criteria corresponding to the condition; retrieve, from a repository connected to the server, a set of data objects according to the selection criteria; generate, from the retrieved data objects, a contextual dataset associated with the condition; and present the contextual dataset to a client computing device.

FIG. 1 depicts a system 100 for automated contextualization of operational observations. The system 100 may be deployed in association with at least one facility, such as a warehouse or other transport and logistics facility (e.g. in which packages are received, stored and/or shipped). As will be apparent in the discussion below, the system 100 may also be deployed in a wide variety of other types of facilities.

The system 100 includes a plurality of monitoring devices 104, of which three examples 104-1, 104-2 and 104-3 are depicted (collectively referred to as the monitoring devices 104, and generically referred to as a monitoring device 104). The monitoring devices 104 can include environmental sensors such as temperature sensors, humidity sensors, and the like. The monitoring devices 104 can also include image sensors (i.e. cameras), barcode scanners, and the like. The monitoring devices 104 may be disposed at static positions within the facility, or may be mobile. For example, a barcode scanner may be a component of a mobile computer carried and operated by a worker in the facility.

The monitoring devices 104 generate streams of data objects containing measurements, images, barcode data, and the like (in accordance with the type of each monitoring device 104). The data objects generated by the monitoring devices 104 are transmitted, e.g. via a network 108, to a repository 112 such as a data lake, where the data objects are stored for subsequent processing. Each data object may include a measurement or other data (e.g. a temperature measurement, a decoded barcode, or the like), as well as a timestamp indicating the date and time the measurement was captured. Each data object may also include a monitoring device identifier, such as a serial number of the monitoring device 104 that generated the data object. Various other attributes may also be contained in the data objects, such as a location of the corresponding monitoring device 104 within the facility, and the like.

The repository 112, therefore, collects data objects representing various environmental and operational characteristics captured within the facility. In other examples, different classes of monitoring devices 104 may upload data objects to distinct repositories.

The system 100 also includes a server 116 connected to the network 108 and configured to access the repository 112 (or, as noted above, multiple repositories when relevant) via at least one application programming interface (API). In some examples, the repository 112 can be hosted at the server 116. As will be discussed below in greater detail, the server 116 is configured to select a subset of the data objects in the repository for use in generation a contextual dataset corresponding to an observed condition reported to the server 116, e.g. by a worker in the facility.

The observed condition may be a condition that is not autonomously detectable by the server 116 from the data objects in the repository 112, although the observed condition may occur as a result of characteristics of the facility that are represented in the data objects of the repository 112. The contextual dataset mentioned above contains data objects likely to represent the facility characteristics from which the observed condition emerged. The server 116, in other words, may implement one or more synthetic sensors by automatically detecting correlations between observed conditions and the autonomously collected data objects. Each synthetic sensor may, having received a condition detection as input (e.g. condensation on packages within the facility), reconstruct a set of data objects that explain the condition and enable action to address the condition. The availability of that set of data objects may also enable the automation of actions to address the condition.

The above-mentioned observed conditions are reported to the server 116 via at least one client computing device 120 (also referred to simply as the device 120). The client device 120 can be a mobile device, such as a handheld computer, tablet or the like. The client device 120 can also be a stationary device, such as a desktop computer deployed within the facility. A facility may contain a number of client devices 120, each at least some of which can implement the functionality discussed below.

The client computing device 120 may also generate data objects and transmit the data objects to the repository 112. Examples of data objects generated by the client computing device 120 include package identifiers decoded from barcodes, which may be reported to the repository 112 and stored as data objects along with an identifier of the client computing device 120 itself, a location of the client computing device 120 corresponding to the barcode scan, and the like.

The client device 120 can be operated to capture and submit an observation record. The observation record describes a condition observed in the facility, e.g. by the operator of the client device 120. As seen in the discussion below, the observation record may be captured by the client device as a text string, an audio recording, or the like. In other words, the observation record may be an unstructured narrative, written or spoken in natural language. The condition described by the observation record (e.g. condensation observed on certain packages within the facility) is not necessarily directly associated with the client device 120 itself.

The server 116, in response to receiving the observation record, is configured to process the observation record to determine selection criteria corresponding to the condition described by the observation record. The server 116 is then configured to retrieve data objects from the repository 112 according to the selection criteria, and to generate a contextual dataset corresponding to the observation record from the retrieved data objects. The contextual dataset may be presented to the client device 120 or to another computing device. In some examples, the server 116 may also automatically determine a control action to implement to resolve or otherwise address the condition described in the observation record based on the contextual dataset.

Figure 2:
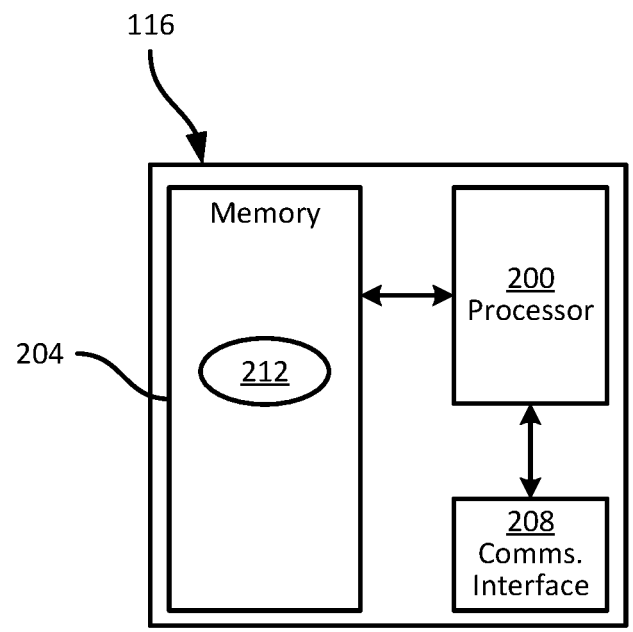
FIG. 2 is a block diagram of certain internal hardware components of the server of FIG. 1.

Turning to FIG. 2, certain internal components of the server 116 are illustrated. The server 116 includes a controller, such as a processor 200, interconnected with a non-transitory computer readable storage medium, such as a memory 204. The memory 204 includes a combination of volatile memory (e.g. Random Access Memory or RAM) and non-volatile memory (e.g. read only memory or ROM, Electrically Erasable Programmable Read Only Memory or EEPROM, flash memory). The processor 200 and the memory 204 each comprise one or more integrated circuits. The server 116 also includes a communications interface 208 enabling the server 116 to exchange data with other devices such as client device 120 and the repository 112, e.g. via the network 108.

The memory 204 stores computer readable instructions for execution by the processor 200. In particular, the memory 204 stores a context generation application 212 which, when executed by the processor 200, configures the processor 200 to process generate contextual datasets for collected observations. Those skilled in the art will appreciate that the functionality implemented by the processor 200 via the execution of the application 212 may also be implemented by one or more specially designed hardware and firmware components, such as FPGAs, ASICs and the like in other embodiments.

Figure 3:
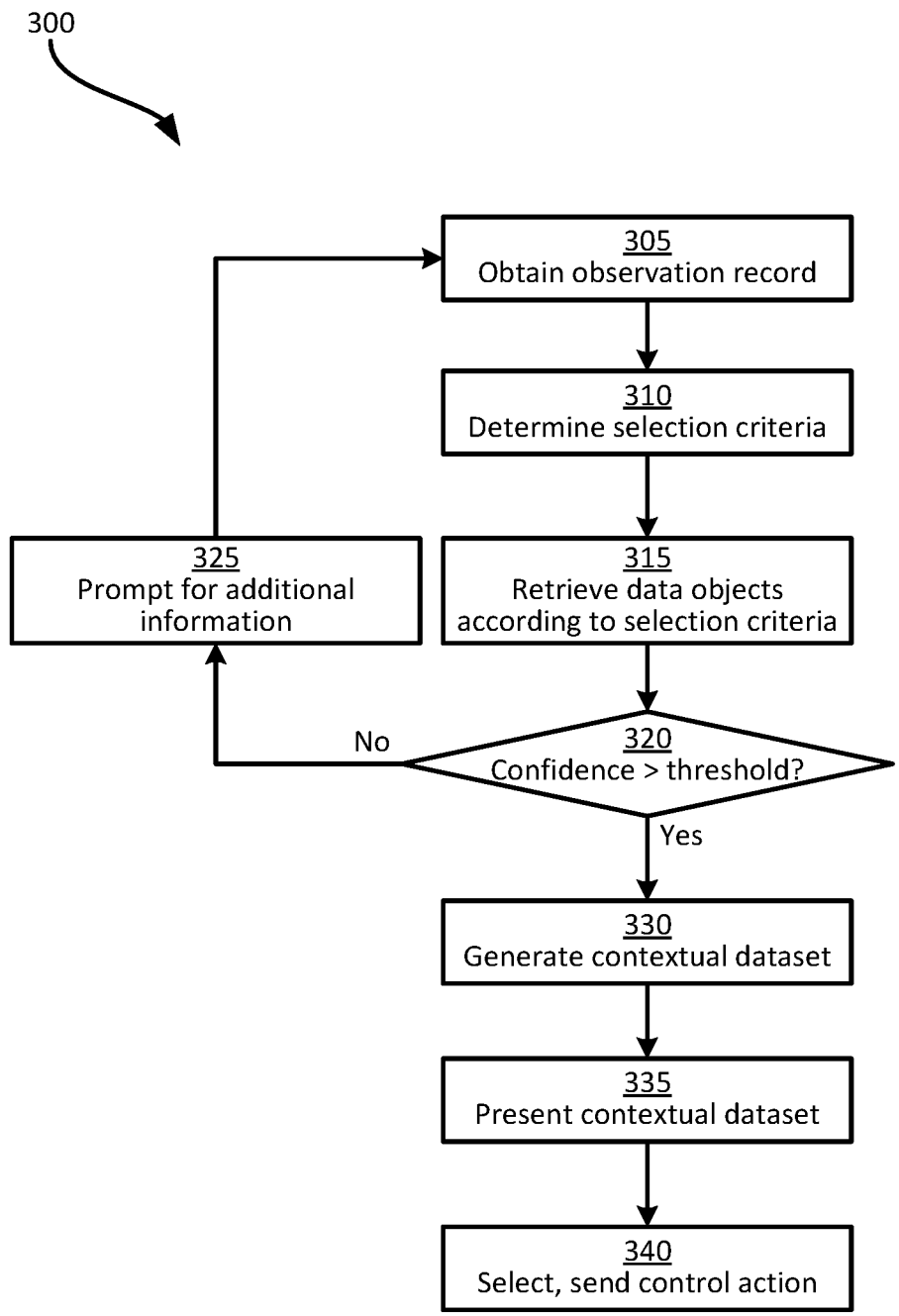
FIG. 3 is a flowchart of a method of automated contextualization of operational observations.

Turning now to FIG. 3, the functionality implemented by the server 116 will be discussed in greater detail. FIG. 3 illustrates a method 300 of contextualizing operational observations, as described in the observation records mentioned above. The method 300 will be discussed in conjunction with its performance in the system 100, and particularly by the server 116, via execution of the application 212.

At block 305, the server 116 is configured to obtain an observation record describing a condition at a facility. In the present example, the server 116 obtains the observation record by receiving the observation record from the client device 120, via the network 108. For example, the client device 120 may execute an application that configures the client device 120 to accept commands from an operator thereof to record and send an observation record to the server 116.

The observation record can include an identifier of the client device 120 (e.g. a serial number or other unique identifier), as well as a location of the client device 120. The location may be an absolute location, such as GPS coordinates, or a relative location such as an indicator of an area within the facility, coordinates according to a facility-specific frame of reference, or the like. The observation record may also contain an account identifier, e.g. associated with the current operator of the client device 120.

In addition, the observation record also contains a description of the above-mentioned condition. The description is captured by the client device 120 via a keypad, microphone, touch screen or the like. The description is, for example, an unstructured string of text (i.e. natural language, whether spoken or written).

The server 116, in response to receiving the descriptor record, is configured to determine whether the description therein is an audio recording or a string of text. When the description is a string of text, the server 116 proceeds to block 315. When the description is an audio recording, the server 116 can be configured to convert the audio record to a string of text via a suitable speech-to-text mechanism. The speech-to-text conversion can be performed at the server 116 itself, or by transmitting the audio recording to another computing device for conversion and receiving the resulting string of text at the server 116. The original audio recording may be retained at the server 116, or may simple be discarded following the conversion.

For the present example performance of the method 300, it is assumed that the system 100 is deployed in a transport and logistics facility that handles packages, and the descriptor record received from the client device 120 at block 305 includes the string "Packages appear to be affected by condensation forming on the boxes in the afternoon".

At block 310, the server 116 is configured to determine a set of selection criteria corresponding to the condition described in the observation record. The set of selection criteria are determined via processing of the observation record itself, and will subsequently be used at the server 116 to automatically identify and retrieve data objects previously generated by the monitoring devices 104 that are likely to be relevant to the described condition.

To determine the selection criteria at block 310, the server 116 is configured to identify keywords in the description mentioned above. For example, the server 16 may apply any suitable natural language processing (NLP) mechanism to the description to identify and lemmatize individual words in the description, remove extraneous words therefrom, and the like. Having identified keywords from the description, the server 116 may compare the keywords to a set of selection rules to generate the selection criteria. The selection rules may be implemented as a dictionary stored at the server 116 and mapping various preconfigured keywords to types of data objects generated by the monitoring devices 104. For example, the term "condensation" may be mapped to the data object types of temperature and humidity, which are generated, respectively, by temperature sensing monitoring devices 104, and humidity sensing monitoring devices 104. As a further example, the term "packages" (and/or similar terms such as "products", "items" and the like) may be mapped to package data objects containing package identifiers and other information received from barcode scanners.

The selection criteria generated at block 310 may also include criteria other than the above-mentioned data object types. For example, time-based selection criteria and location-based selection criteria may be generated at block 310. For example, time-based criteria can be generated by detecting a time-related keyword (e.g. "afternoon") in the description. The above-mentioned dictionary or other mapping rules can define time ranges corresponding to such time-related keywords.

As a further example, the location of the client device 120 at the time the observation record was generated can be included in the observation record, and that location can be employed to generate location-based selection criteria. For example, the server 116 can generate a selection criterion encompassing any data object locations within a certain distance of the client device 120 location, in the same area of the facility as the client device 120, or the like.

In some examples, more complex selection criterion generation may be implemented by the server 116 in connection with locations. For example, the server 116 can be configured (e.g. according to the above-mentioned mapping rules) to generate an initial location criterion based on the location in the observation record. When the keywords identified at block 310 include certain predefined keywords (e.g. "packages"), the server 116 can be configured to generate a secondary location criterion by retrieving certain data objects according to the initial location criterion, and employing the locations specified in the retrieved data objects. An example of this operation will be discussed further below in connection with FIG. 4.

At block 315, the server 116 is configured to retrieve data objects from the repository 112 according to the selection criteria generated at block 310. That is, the server 116 is configured to access the repository and retrieve any data objects that satisfy the selection criteria. Thus, for example, the server 116 may retrieve any data objects having the types "temperature" or "humidity", and indicating that they contain measurements recorded within the relevant time period and at the relevant location determined at block 310.

The server 116 therefore obtains, at block 315, a set of data objects that are likely to be related to the condition described in the observation record obtained at block 305. That is, the data objects retrieved at block 315 may define a record of environmental or other facility characteristics that lead to the observed condition (e.g. temperature and humidity levels in certain areas of the facility that may have lead to the condensation observed by a worker).

At block 320, the server 116 can be configured to determine a confidence level associated with the selection criteria from block 310 and/or the data objects retrieved at block 315. In general, the confidence level indicates a likelihood that the selection criteria accurately reflect the description in the observation record from block 305 (i.e. that the description was accurately interpreted by the server 116), and/or a likelihood that the retrieved data objects from block 315 are in fact associated with the condition described in the observation record.

The confidence level can include a confidence level generated by the NLP mechanism applied to interpret the natural language description in the observation record. The confidence level can also include, in the event that the description is an audio recording, a confidence level produced by the speech-to-text mechanism applied to convert the audio recording to a text string. The confidence level can also include determining a number of retrieved data objects.

At block 320, the confidence level is compared to at least one threshold. For example, a confidence level generated by an NLP mechanism can be compared to a predefined threshold. As a further example, a number of retrieved data objects can be compared to a lower threshold and an upper threshold. If the number of retrieved data objects falls below the lower threshold, the determination at block 320 may be negative, on the grounds that too few data objects have been retrieved, indicating erroneously narrow selection criteria. Conversely, if the number of retrieved data objects exceeds the upper threshold, the determination at block 320 may also be negative, as large numbers of retrieved data objects may indicate poorly bounded selection criteria likely to match data objects that are not relevant to the condition described in the observation record from block 305.

When the determination at block 320 is negative, the server 116 can transmit a message to the client device 120 prompting the operator of the client device 120 for further information (e.g. a more specific description).

When the determination at block 320 is affirmative, the server 116 proceeds to block 330, at which a contextual dataset is generated based on the retrieved data objects from block 315. The contextual dataset, in some examples, is simply the set of data objects retrieved at block 315. In other examples, however, the contextual dataset can be derived from the data objects retrieved at block 315, e.g. according to a set of rules for contextual dataset generation defined in the application 212. The set of rules can specify, for example, mechanisms by which to generate contextual data corresponding to each type of data object present in the set retrieved at block 315. For example, for temperature and humidity data objects, the server 116 can generate the contextual dataset by determining an average of the temperature and/or humidity measurements defined in the retrieved data objects. In other examples, the server 116 may generate trendlines, plots or the like of measurements from the retrieved data objects.

At block 335, the server 116 is configured to present the contextual dataset, e.g. to the client device 120, another computing device, or both. Presentation of the contextual dataset at block 335 can follow generation of the contextual dataset directly (e.g. substantially immediately), but can also be separated in time from the performance of block 330. For example, the contextual dataset may be stored in the memory 204 and presented to another computing device responsive to a subsequent request from that computing device. For example, the server 116 may implement a dashboard (e.g. via a client-server application, a web server or the like) through which the client device 120 can request data including the contextual datasets for previously recorded observations. Block 335 may therefore be performed in response to a request received via such a dashboard.

At block 340, the server 116 may also automatically generate and send a control action to another device within the facility. The other device can include an environmental control device (e.g. a heater, air conditioning unit, or the like). The other device can also include a computing device to which a notification or instruction is transmitted. Generation of the control action is performed based on the contextual dataset. For example, in the case of environmental measurements such as temperature and humidity, the server 116 can be configured to determine an average value or the like of the measurements from the retrieved data objects, compare the average value to a target, and generate an instruction to adjust environmental control device based on the difference between the average value and the target.

Figure 4:
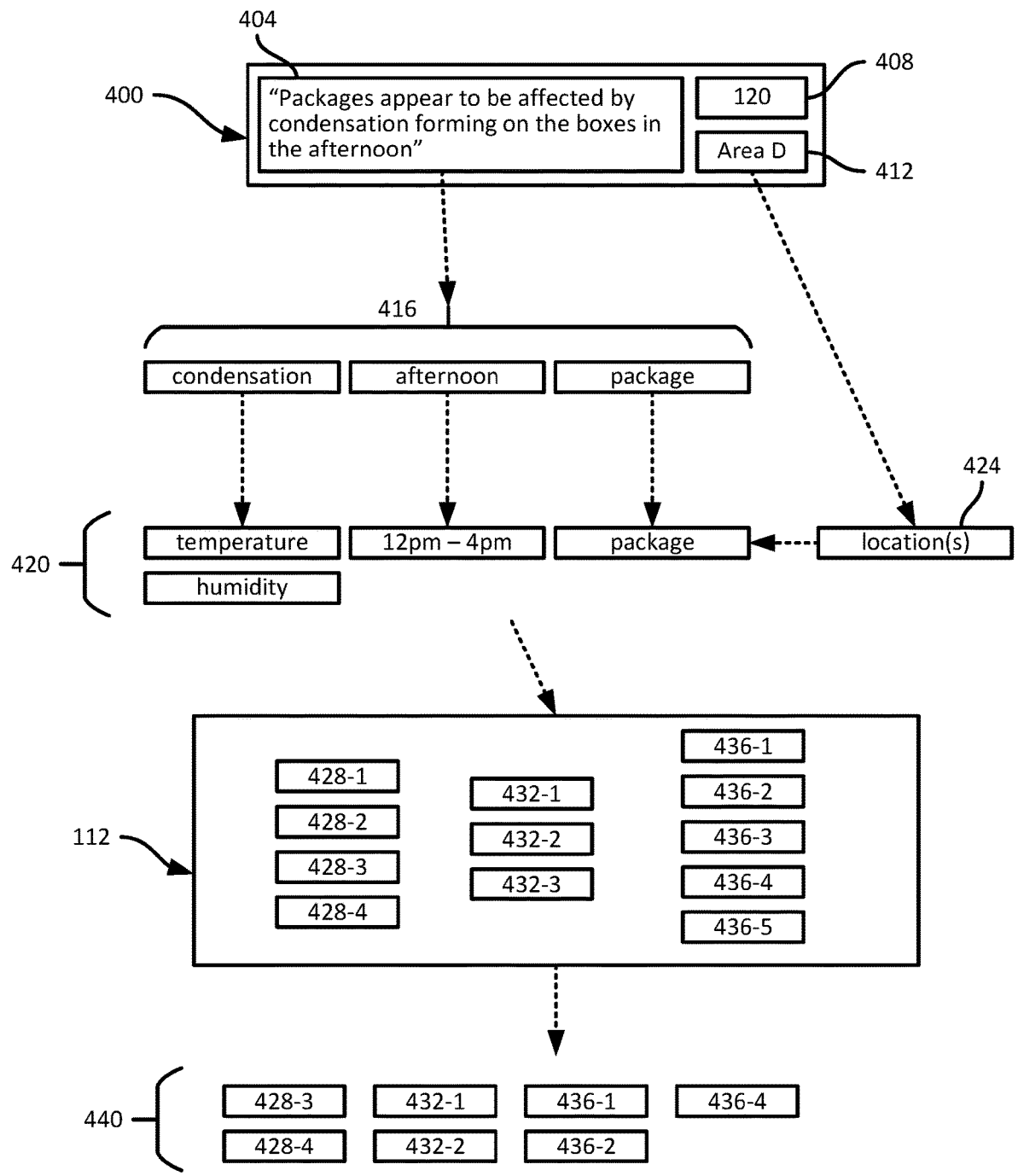
FIG. 4. is a diagram illustrating example performances of blocks 305, 310 and 315 of the method of FIG. 3.

Turning to FIG. 4, an example performance of the method 300 is illustrated schematically, based on the above-mentioned description. In particular, FIG. 4 illustrates an observation record 400 containing a natural language description 404 in the form of a string of text. The record 400 also includes a device identifier 408 (corresponding to the client device 120) and a device location 412 corresponding to an area of the facility in which the client device 120 generated the record 400.

The server 116, having received the record 400, generates a set of keywords 416 therefrom at block 310. Also at block 310, based on the keywords and the above-mentioned mapping rules, the server 116 generates selection criteria 420. The selection criteria contain three data object types (temperature, humidity and packages), as well as a time criterion corresponding to the keyword "afternoon". The selection criteria also include a location criterion 424 that may be generated via the two-stage process discussed earlier. That is, the server 116 may retrieve any package data objects 428 (of which four examples 428-1, 428-2, 428-3 and 428-4 are shown in FIG. 4) having location identifiers that match the location 412 at or near the time at which the record 400 was generated. The server 116 can then determine any previous locations at which the same package identifiers appear in the repository 112, and the previous locations can be employed as selection criteria.

Responsive to generation of the selection criteria, the server 116 is configured to retrieve data objects from the repository according to the selection criteria. In particular, in addition to the package data objects 428, the repository may include temperature data objects 432-1, 432-2 and 432-3 as well a humidity data objects 436-1, 436-2, 436-3, 436-4, and 436-5. The server 116 is configured, at block 315, to retrieve any of the data objects in the repository 112 that were recorded in the time period from the criteria 420, at the location(s) 424, and have any of the data object types specified in the criteria 420. The server 116 thus retrieves, in this example, a set 440 of data objects that includes the data objects 428-3 and 428-4 (representing scans of particular packages by a barcode scanner), the data objects 432-1 and 432-2 (representing temperature measurements for certain areas of the facility), and the data objects 436-1, 436-2 and 436-4 (representing humidity measurements for certain areas of the facility).

Figure 5:
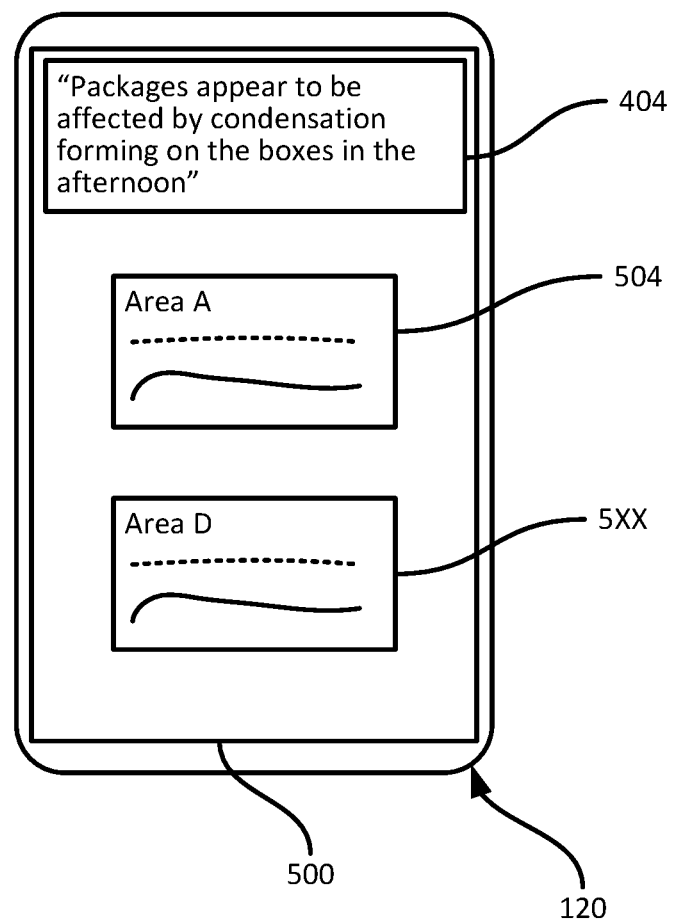
FIG. 5 is a diagram illustrating a performance of block 335 of the method of FIG. 3.

Turning to FIG. 5, the client device 120 is shown following a performance of block 335 by the server 116, at which the server 116 transmitted a contextual dataset generated from the set 440 of data objects mentioned above. The contextual dataset is shown rendered on a display 500 of the client device 120, and includes, for example, the original description 404 as well as a plot 504 of temperature and humidity measurements for a first location ("Area A") defined in the selection criteria 420, and a plot 508 of temperature and humidity measurements for a second location ("Area D") defined in the selection criteria 420. The first location may correspond to the location at which the observation record was generated, and the second location may correspond to a location within the facility where the relevant packages were previously located in the time period defined in the selection criteria 420. The contextual dataset may also include a list of affected packages (e.g. package IDs retrieved from the data objects 428-3 and 428-4 shown in the set 440 in FIG. 4).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method, comprising:
   obtaining, at a server, an observation record describing a condition at a facility observed by a user by receiving the observation record from a client computing device of the user via a network;
   determining, from the observation record, a set of selection criteria corresponding to the condition;
   retrieving, from a repository connected to the server, a subset of data objects from among a plurality of data objects according to the selection criteria, the data objects being generated by at least one of a monitoring device of the facility and the client computing device and being indicative of at least one characteristic of the facility;
   generating, from the retrieved subset of data objects, a contextual dataset associated with the condition; and
   presenting the contextual dataset to the client computing device
   wherein the observation record is captured by the client computing device and includes at least one of an audio recording and a string of unstructured text.

2. The method of claim 1, further comprising, when the observation record includes the audio recording, converting the audio recording to the string of unstructured text.

3. The method of claim 1, wherein determining the selection criteria includes determining at least one keyword from the unstructured string of text.

4. The method of claim 1, wherein the selection criteria include at least one of a data object type, a time period, and a location indicator.

5. The method of claim 1, wherein generating the contextual dataset includes generating average measurements of environmental conditions based on the retrieved subset of data objects.

6. The method of claim 1, wherein presenting the contextual dataset includes:
   receiving a request from the client computing device; and
   transmitting the contextual dataset to the client computing device.

7. The method of claim 1, further comprising:
   generating a control action based on the contextual dataset; and
   transmitting the control action to an environmental control device.

8. The method of claim 1, further comprising, prior to generating the contextual dataset:
   determining a confidence level associated with at least one of the selection criteria and the retrieved subset of data objects;
   determining whether the confidence level exceeds a threshold; and
   when the determination is negative, transmitting a prompt for further information to the client computing device associated with the observation record.

9. A server, comprising:
   a memory; and
   a processor connected with the memory, the processor configured to:
      obtain an observation record describing a condition at a facility observed by a user by receiving the observation record from a client computing device of the user via a network;

determine, from the observation record, a set of selection criteria corresponding to the condition;

retrieve, from a repository connected to the server, a subset of data objects from among a plurality of data objects according to the selection criteria, the data objects being generated by at least one of a monitoring device of the facility and the client computing device and being indicative of at least one characteristic of the facility;

generate, from the retrieved subset of data objects, a contextual dataset associated with the condition; and present the contextual dataset to the client computing device, wherein the observation record is captured by the client computing device and includes at least one of an audio recording and a string of unstructured text describing the condition.

10. The server of claim 9, wherein the processor is configured to, when the observation record includes the audio recording, convert the audio recording to the string of unstructured text.

11. The server of claim 9, wherein the processor is configured, in order to determine the selection criteria, to determine at least one keyword from the unstructured string of text.

12. The server of claim 9, wherein the selection criteria include at least one of a data object type, a time period, and a location indicator.

13. The server of claim 9, wherein the processor is configured, in order to generate the contextual dataset, to generate average measurements of environmental conditions based on the retrieved subset of data objects.

14. The server of claim 9, wherein the processor is configured, in order to present the contextual dataset, to:
receive a request from the client computing device; and
transmit the contextual dataset to the client computing device.

15. The server of claim 9, wherein the processor is configured to:
generate a control action based on the contextual dataset; and
transmit the control action to an environmental control device.

16. The server of claim 9, wherein the processor is further configured, prior to generating the contextual dataset, to:
determine a confidence level associated with at least one of the selection criteria and the retrieved subset of data objects;
determine whether the confidence level exceeds a threshold; and
when the determination is negative, transmit a prompt for further information to the client computing device associated with the observation record.

* * * * *